(12) United States Patent
Shimoyama (10) Patent No.: US 12,525,306 B2
(45) Date of Patent: Jan. 13, 2026

(54) STORAGE APPARATUS, LIQUID DISCHARGE HEAD, AND LIQUID DISCHARGE APPARATUS

(71) Applicant: Canon Kabushiki Kaisha, Tokyo (JP)

(72) Inventor: Yoji Shimoyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 229 days.

(21) Appl. No.: 18/176,584

(22) Filed: Mar. 1, 2023

(65) Prior Publication Data

US 2023/0317186 A1 Oct. 5, 2023

(30) Foreign Application Priority Data

Mar. 30, 2022 (JP) ................. 2022-057093

(51) Int. Cl.
| | | |
|---|---|---|
| *G11C 17/16* | (2006.01) | |
| *B41J 2/045* | (2006.01) | |
| *B41J 5/44* | (2006.01) | |
| *G11C 17/18* | (2006.01) | |

(52) U.S. Cl.
CPC ........... *G11C 17/16* (2013.01); *B41J 2/04541* (2013.01); *B41J 2/04555* (2013.01); *B41J 5/44* (2013.01); *G11C 17/18* (2013.01)

(58) Field of Classification Search
CPC .......... G11C 17/16; G11C 17/18; G11C 8/20; H01L 23/5252
See application file for complete search history.

(56) References Cited

U.S. PATENT DOCUMENTS

| | | | | |
|---|---|---|---|---|
| 5,008,855 | A | * | 4/1991 | Eltoukhy ............ H01L 23/5252 365/96 |
| 10,226,921 | B2 | | 3/2019 | Ohmura |
| 10,894,403 | B2 | * | 1/2021 | Fujii .................... B41J 2/04586 |
| 2020/0227103 | A1 | * | 7/2020 | Shao ....................... G11C 8/20 |

FOREIGN PATENT DOCUMENTS

JP 2014058130 A 4/2014

OTHER PUBLICATIONS

Co-pending U.S. Appl. No. 18/188,546, filed Mar. 23, 2023.
Co-pending U.S. Appl. No. 18/169,290, filed Feb. 15, 2023.

* cited by examiner

*Primary Examiner* — Lam S Nguyen (74) *Attorney, Agent, or Firm* — Venable LLP (57) ABSTRACT

A storage apparatus, comprising a memory unit including an anti-fuse element and a resistance element connected in parallel to the anti-fuse element, and an information writer that writes information into the anti-fuse element by cyclically applying a signal to the memory unit, wherein the information writer changes a cycle of a signal to be applied to the memory unit on a basis of a current value supplied to the memory unit.

9 Claims, 9 Drawing Sheets

STORAGE APPARATUS, LIQUID DISCHARGE HEAD, AND LIQUID DISCHARGE APPARATUS

BACKGROUND OF THE INVENTION

Field of the Invention

The present invention relates to mainly a storage apparatus.

Description of the Related Art

Some electrical appliances include a storage apparatus for storing unique information of a product (see Japanese Patent Laid-Open No. 2014-58130). As the storage apparatus, a memory element that can write information for one time, what is called a one time programmable (OTP) memory can be used.

As an example of the OTP memory, an anti-fuse element having a MOS structure is used, and in this case, writing of information can be realized by dielectric breakdown of the MOS structure. However, since a difference in electrical characteristics due to, for example, manufacturing variation can occur among the plurality of anti-fuse elements, a technique for writing appropriate information in consideration of this can be required.

SUMMARY OF THE INVENTION

The present invention has been made in response to recognition of the above problem by the inventor, and enables more appropriate writing of information in a storage apparatus.

One of the aspects of the present invention provides a storage apparatus, comprising a memory unit including an anti-fuse element and a resistance element connected in parallel to the anti-fuse element, and an information writer that writes information into the anti-fuse element by cyclically applying a signal to the memory unit, wherein the information writer changes a cycle of a signal to be applied to the memory unit on a basis of a current value supplied to the memory unit.

Further features of the present invention will become apparent from the following description of exemplary embodiments (with reference to the attached drawings).

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Figure 1:
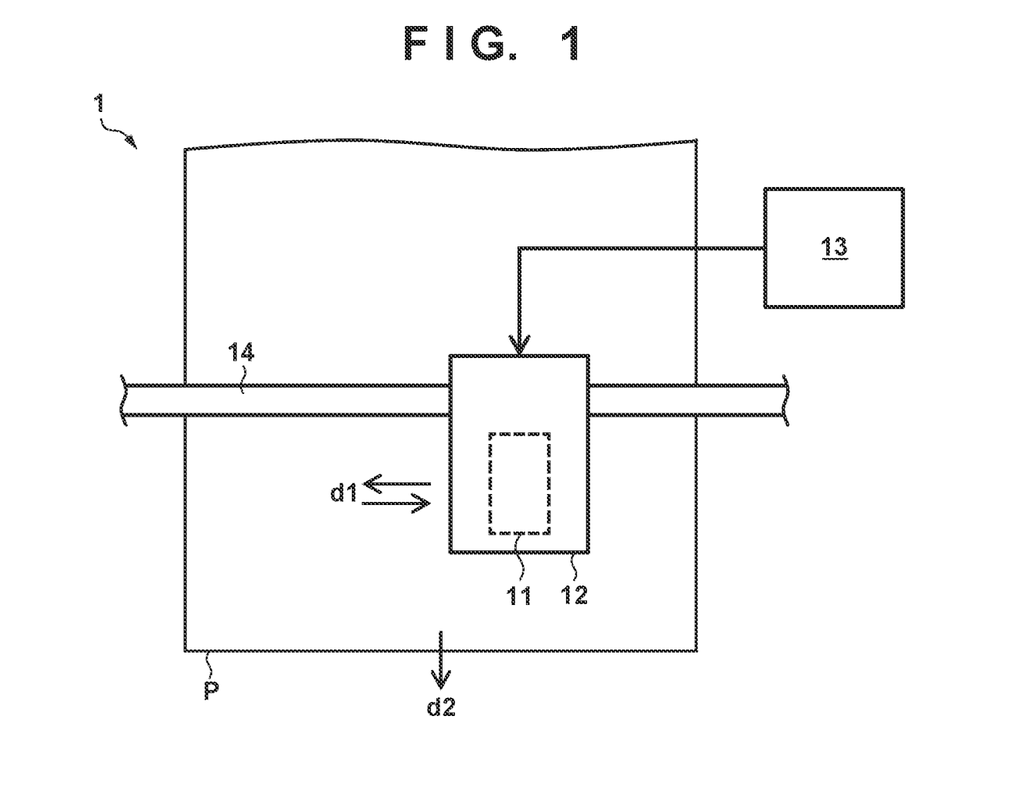
FIG. 1 is a schematic diagram illustrating an example of an overall configuration of a liquid discharge apparatus according to an embodiment.

FIG. 1 is a schematic diagram illustrating an example of the overall configuration of a liquid discharge apparatus 1 according to an embodiment. The liquid discharge apparatus 1 includes a liquid discharge head 11, a carriage 12, and a head controller 13 for performing drive control of them.

The liquid discharge head 11 is provided with a plurality of nozzles (discharge openings) for discharging a liquid, and the liquid discharge head 11 includes a head substrate provided with a plurality of liquid discharge elements corresponding to the plurality of nozzles. As the liquid, ink can be typically used. The liquid discharge head 11 drives individual liquid discharge elements on the basis of a drive signal or a control signal from the head controller 13. Due to this, ink is discharged from a corresponding nozzle, and desired recording is executed on a recording medium P such as a sheet-like paper material. Such a recording mode can be referred to as inkjet method.

The liquid discharge head 11 is installed in the carriage 12, and the carriage 12 can reciprocate in a direction d1 along a guide 14 on the basis of a drive signal or a control signal from the head controller 13. The recording medium P is conveyed in a direction d2 by a conveyance mechanism of the liquid discharge apparatus 1, and the liquid discharge head 11 can reciprocate in the direction d1 by the carriage 12 during the conveyance.

The head controller 13 performs drive control of the liquid discharge head 11 while reciprocating the carriage 12. Due to this, desired recording is realized on the recording medium P, and for example, characters, symbols, figures, photographs, and the like are formed.

The head controller 13 may be expressed as a head driver or the like. The liquid discharge head 11 may be simply expressed as a discharge head or may be expressed as a recording head. In the present embodiment, the liquid discharge head 11 can also be expressed as an inkjet head, a serial head, or the like. The liquid discharge apparatus 1 may be simply expressed as a discharge apparatus or may be expressed as a recording apparatus. In the present embodiment, the liquid discharge apparatus 1 can also be expressed as an inkjet printer or the like.

Figure 2:
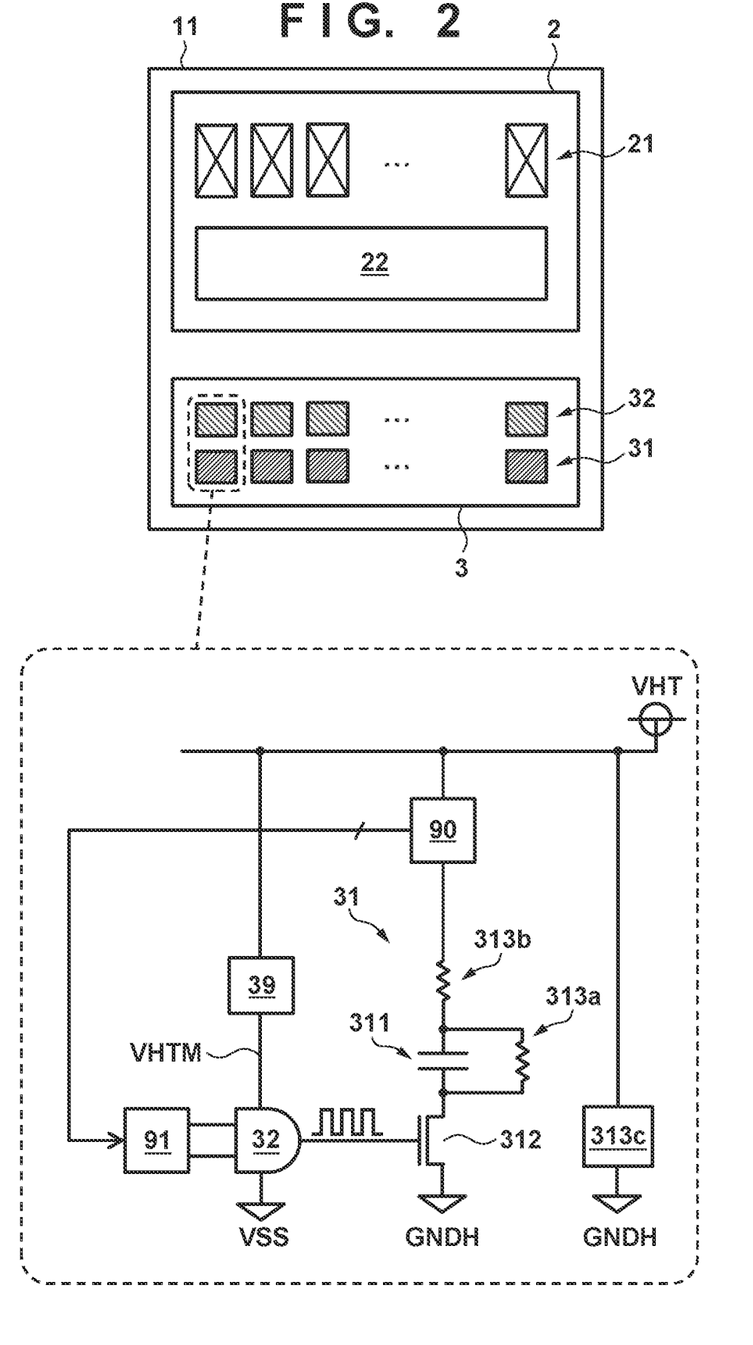
FIG. 2 is a view illustrating an example of a configuration of a liquid discharge head.

FIG. 2 is a view illustrating an example of the configuration of the liquid discharge head 11. The liquid discharge head 11 includes a functional unit 2 for realizing its main function (here, recording function) and a storage apparatus 3 that can store predetermined information. The functional unit 2 and the storage apparatus 3 may be provided on the same semiconductor substrate, may be provided on separate semiconductor substrates, or may be provided on partially same semiconductor substrates.

In the present embodiment, the functional unit 2 includes a plurality of liquid discharge elements 21 and an element drive unit 22 that can individually drive the liquid discharge elements. The liquid discharge element 21 may be simply expressed as a discharge element or may be expressed as a recording element or the like. As the liquid discharge element 21, a heater element or an electrothermal conversion element can be typically used, but other elements such as a piezoelectric element may be used. Although description is omitted here, the functional unit 2 is to be configured to be drivable by a known method, and for example, the plurality of liquid discharge elements 21 may be divided into several blocks and may be driven in units of blocks (in what is called a time division drive method).

The storage apparatus 3 can store unique information of the liquid discharge head 11. Examples of the unique information include a specifier, a serial number, and a unique parameter. The storage apparatus 3 includes a plurality of memory units 31 and a plurality of information writers 32. The memory unit 31 includes an anti-fuse element 311, a switch element 312, and protection elements 313a and 313b.

The anti-fuse element 311 is a memory element that can write information for one time, that is, a memory element that cannot rewrite information, and functions as what is called a one time programmable (OTP) memory. In the present embodiment, a metal oxide semiconductor (MOS) structure is used for the anti-fuse element 311. This MOS structure indicates a state in which information is not written before dielectric breakdown, and indicates a state in which information is written after dielectric breakdown.

A known high-voltage transistor such as a double-diffused MOS (DMOS) transistor may be used for the switch element 312. The switch element 312 is brought into a conductive state (ON state) or a non-conductive state (OFF state) on the basis of a signal from the information writer 32. When the switch element 312 is brought into the conductive state, a voltage VHT is supplied to the anti-fuse element 311, and when the switch element 312 is brought into the non-conductive state, the supply is suppressed.

As described in detail below, the voltage VHT is cyclically supplied to the anti-fuse element 311 by cyclically driving the switch element 312. Due to this, the MOS structure that is the anti-fuse element 311 is subjected to dielectric breakdown, and information is written into the anti-fuse element 311. The writing of information may be expressed as writing of information to the memory unit 31, or may be expressed as writing of information to the storage apparatus 3.

The protection element 313a is connected in parallel to the anti-fuse element 311, and a resistance element (for example, 80 kΩ (kilohm)) can be used as the protection element 313a. The protection element 313b is connected in series to the anti-fuse element 311, and a resistance element (for example, 1 kΩ) can be used as the protection element 313b. According to such a configuration, when an unexpected overvoltage such as electrostatic discharge (ESD) is applied to the power source line of the power source voltage VHT, the overvoltage can be guided to another protection element 313c connected to the power source line. This makes it possible to prevent unexpected writing of information to the anti-fuse element 311 due to the overvoltage.

The information writer 32 is a logic circuit provided corresponding to the individual memory units 31, and is a logical multiplication circuit (AND circuit) in the present embodiment. The information writer 32 can be supplied with a voltage VHTM generated from the voltage VHT via a stepdown circuit 39.

Here, the information writer 32 cyclically applies a signal to the memory unit 31 on the basis of a signal from a control unit 91, thereby writing information to the anti-fuse element 311. By cyclically applying a signal to the memory unit 31, a large current from a parasitic capacitance is cyclically supplied to the anti-fuse element 311, whereby writing of information to the anti-fuse element 311 can be realized relatively quickly. More specifically, the state after the dielectric breakdown of the MOS structure includes a state in which the dielectric breakdown is sufficiently performed (what is called hard breakdown state) and a state in which the dielectric breakdown is partially performed (what is called soft breakdown state). Then, by cyclically applying a signal to the memory unit 31, electric energy necessary for bringing the MOS structure from the state before dielectric breakdown into the hard breakdown state through the soft breakdown state can be appropriately supplied to the MOS structure.

The information writer 32 may be expressed as an information writing control unit or simply a writing control unit, or may be expressed as an information writing execution unit or simply a writing execution unit.

Here, a current detection unit 90 for detecting a current value supplied to the memory unit 31 is connected to the memory unit 31. In the present embodiment, the current detection unit 90 is disposed between the power source line of the voltage VHT and the memory unit 31.

Figure 3:
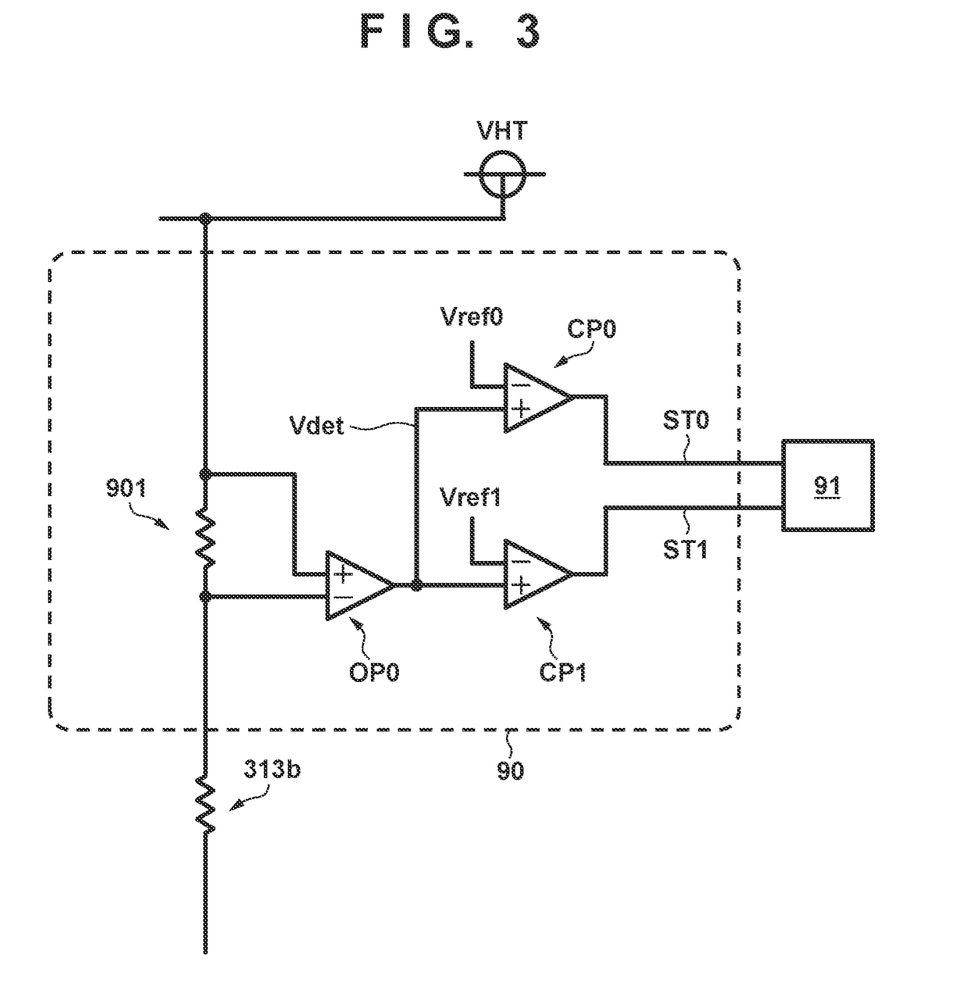
FIG. 3 is a view illustrating an example of a configuration of a current detection unit.

FIG. 3 illustrates an example of the configuration of the current detection unit 90. The current detection unit 90 includes a resistance element 901 as a current detection element, an amplifier OP0, and comparators CP0 and CP1. The resistance element 901 is disposed between the power source line of the voltage VHT and the protection element 313b, and has a resistance value of, for example, 1Ω. The amplifier OP0 amplifies the potential difference generated in the resistance element 901 and outputs the amplified potential difference as an output voltage Vdet to each of the comparators CP0 and CP1. The comparator CP0 compares the output voltage Vdet of the amplifier OP0 with a reference voltage Vref0, and outputs the comparison result as a signal ST0. The comparator CP1 compares the output voltage Vdet of the amplifier OP0 with a reference voltage Vref1 (>Vref0), and outputs the comparison result as a signal ST1.

Here, a resistance element having a relatively high resistance value is used as the protection element 313a connected in parallel with the anti-fuse element 311. Before information is written into the anti-fuse element 311 (before dielectric breakdown of the MOS structure), the anti-fuse element 311 is in a high-impedance state, and therefore a small current can be supplied to the memory unit 31. Therefore, the potential difference that can be generated in the resistance element 901 is relatively small, and the output voltage Vdet of the amplifier OP0 is relatively small.

On the other hand, after information is written into the anti-fuse element 311 (after dielectric breakdown of the MOS structure), the anti-fuse element 311 is in a short-circuit state, and therefore a large current can be supplied to the memory unit 31. Therefore, the potential difference that can be generated in the resistance element 901 becomes large, and the output voltage Vdet of the amplifier OP0 becomes large accordingly.

As the reference voltages Vref0 and Vref1, values that can specify the state of the MOS structure of the anti-fuse element 311 (before or after dielectric breakdown) may be set. As an example, when VHT=24 V, Vref0=0.326 mV (millivolts) can be set as the reference voltage Vref0 for specifying whether the MOS structure is in a state before dielectric breakdown or in a soft breakdown state. Vref1=2.9 mV can be set as the reference voltage Vref1 for specifying whether the MOS structure is in the soft breakdown state or the hard breakdown state.

According to such a configuration, the signals ST0 and ST1 are at an L level (low level) while Vdet<Vref0. While Vref0≤Vdet<Vref1, the signal ST0 is at an H level (high level) and the signal ST1 is at the L level. While Vdet≥Vref1, the signals ST0 and ST1 are at the H level.

Referring again to FIG. 2, the control unit 91 controls the information writer 32 so that a signal is cyclically applied to the memory unit 31 and a cycle (frequency) of the signal is changed on the basis of the signals ST0 and ST1 obtained in this manner. The current detection unit 90 and the control unit 91 may be provided in the storage apparatus 3, but may be provided at any part of the liquid discharge apparatus 1 or may be provided outside the liquid discharge head 11.

The function of the control unit 91 may be realized by a CPU and a memory, but may be realized by a semiconductor apparatus such as an application specific integrated circuit (ASIC), that is, may be realized by any of software and hardware. Typically, the control unit 91 includes one or more processing circuits with a memory, and its function can be realized by executing a predetermined program while developing the program on the memory.

Figure 4:
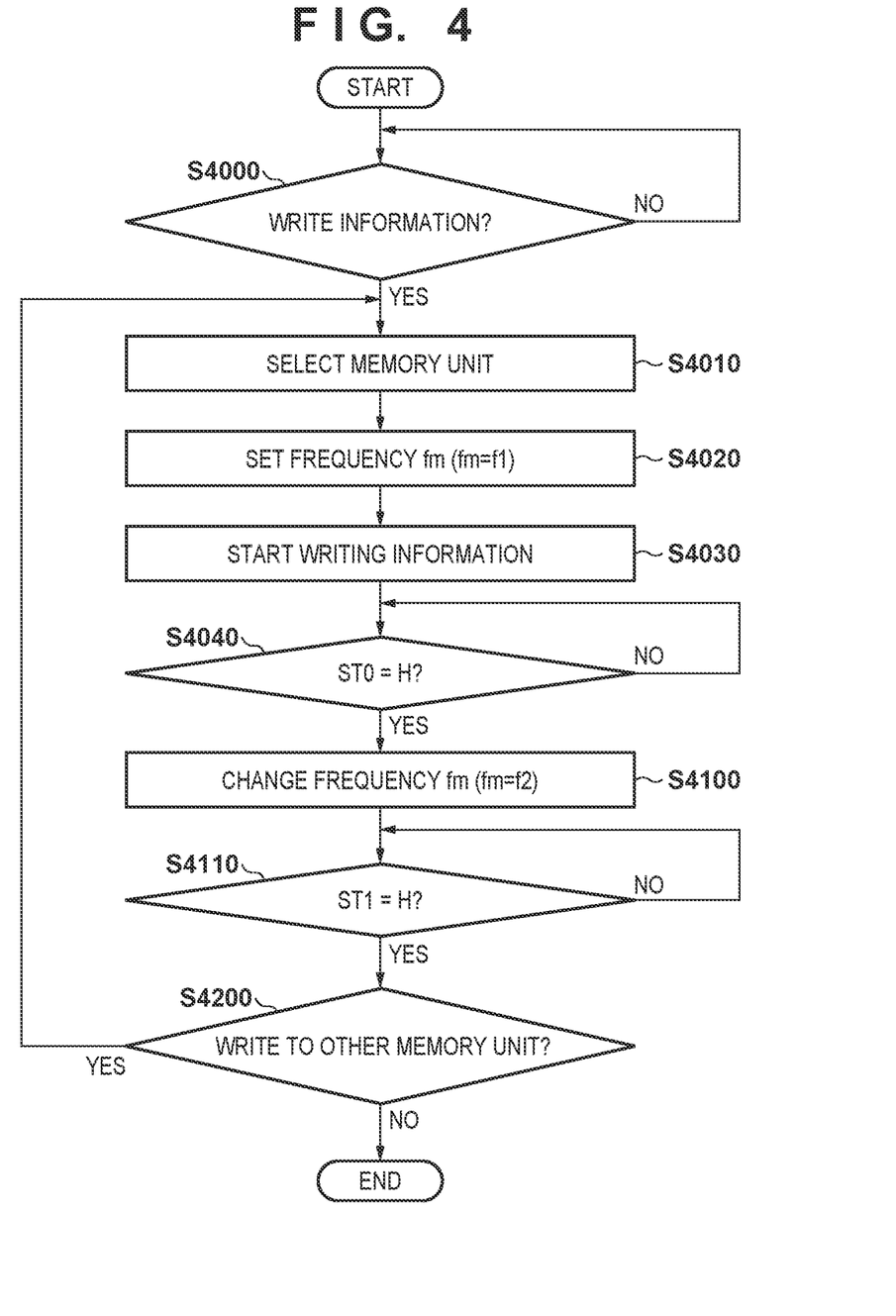
FIG. 4 is a flowchart presenting an example of a control method of an information writer.

FIG. 4 is a flowchart presenting an example of the control method of the information writer 32 by the control unit 91. The present flowchart is executed mainly by the control unit 91, and its outline is that the cycle of the signal output by the information writer 32 is changed on the basis of the detection result of the current detection unit 90.

In step S4000 (Hereinafter, simply presented as "S4000". The same applies to other steps described below.), existence or absence of execution of writing of information to the storage device 3 is determined. This determination can be made on the basis of, for example, whether or not there is a command for instructing writing of information to the storage apparatus 3 from an external apparatus. If writing of information is to be executed, the process proceeds to S4010. Otherwise, the process returns to S4000 (Alternatively, the present flowchart ends).

In S4010, the memory unit 31 to be written is selected from the plurality of memory units 31. The memory unit 31 to be selected can be determined on the basis of the above command instructing writing of information from the external apparatus to the storage apparatus 212.

In S4020, an initial value of a frequency fm for cyclically applying a signal to the memory unit 31 is set. Two or more frequencies fm are to be prepared. Here, a frequency f1 is selected from two frequencies f1 and f2 (Here, f1>f2), and fm=f1 is set.

In S4030, writing of information to the selected memory unit 31 is started. This step is performed by the information writer 32 outputting a signal having the frequency fm to the memory unit 31.

In S4040, the signal level of the signal ST0 is acquired as the detection result of the current detection unit 90, and it is determined whether the signal level is the L level or the H level. The signal ST0 becoming at the H level corresponds to the MOS structure of the anti-fuse element 311 becoming in the soft breakdown state. If the signal ST0 is at the H level, the process proceeds to S4100. Otherwise, the process returns to S4040.

In S4100, the setting value of the frequency fm is changed. Here, it is assumed that fm=f2 (<f1) is set. Due to this, the information writer 32 outputs a signal of the frequency f2 to the memory unit 31.

In S4110, the signal level of the signal ST1 is acquired as the detection result of the current detection unit 90, and it is determined whether the signal level is the L level or the H level. The signal ST1 becoming at the H level corresponds to the MOS structure of the anti-fuse element 311 becoming in the hard breakdown state, that is, corresponds to the writing of information to the memory unit 31 having been completed. If the signal ST1 is at the H level, the process proceeds to S4200. Otherwise, the process returns to S4110.

In S4200, it is determined that writing of information to another memory unit 31 is necessary or not. If writing of information to the other memory unit 31 is necessary, the process returns to S4010, and writing of information to the other memory unit 31 is started in a similar procedure. If writing of information to the other memory unit 31 is not necessary, it is determined that the writing of information into the storage apparatus 3 has been completed, and the present flowchart is ended.

Figure 5A:
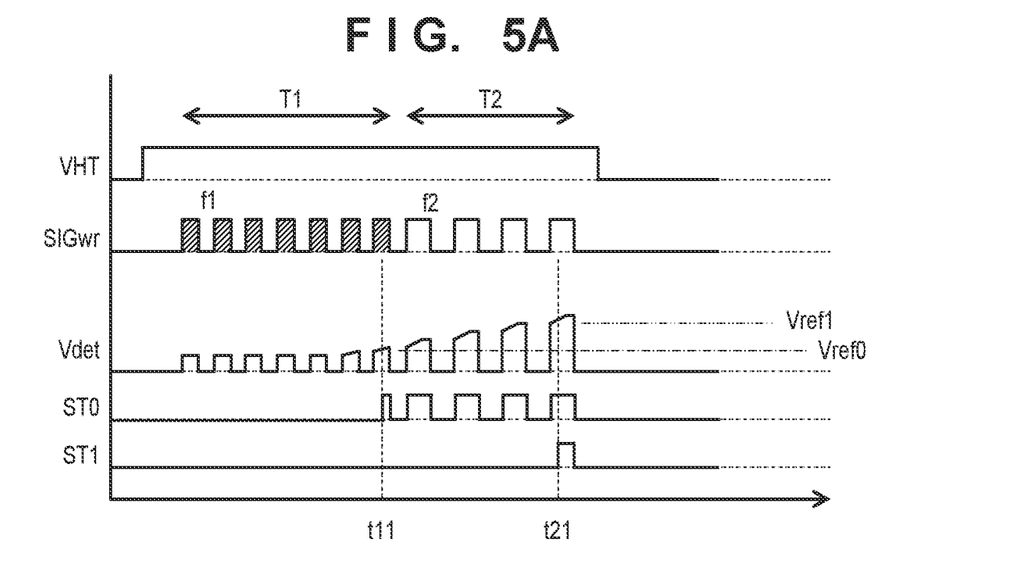
FIG. 5A is a timing chart when information is written into a memory unit.

FIG. 5A presents a timing chart when information is written into the single memory unit 31 on the basis of the present flowchart. In the figure, the horizontal axis represents the time axis, and the vertical axis represents the voltage VHT, a signal SIGwr output by the information writer 32, the voltage Vdet corresponding to the current value supplied to the memory unit 31, and the signals ST0 and ST1.

After the voltage VHT is supplied, in a period T1, a signal pulse having the frequency f1 is supplied to the memory unit 31 as the signal SIGwr. With the signal ST0 becoming at the H level at time t11, in a period T2, a signal pulse having the frequency f2 is supplied to the memory unit 31 as the signal SIGwr. With the signals ST0 and ST1 becoming at the H level at time t21, the supply of the signal SIGwr (frequency f2) is suppressed. Due to this, it is assumed that the writing of information to the memory unit 31 has been completed, and thereafter, the supply of the voltage VHT is suppressed.

According to such a control mode, before the current value supplied to the memory unit 31 reaches a first reference value (in the case of Vdet<Vref0), a signal of the first cycle (frequency f1) is applied to the memory unit 31. After the current value supplied to the memory unit 31 reaches the first reference value (in the case of Vref0≤Vdet<Vref1), a signal of the second cycle (frequency f2) larger than the first cycle is applied to the memory unit 31. Then, in a case where the current value supplied to the memory unit 31 reaches the second reference value larger than the first reference value (in the case of Vref1≤Vdet), the supply of the signal to the memory unit 31 is suppressed.

According to the present embodiment, the cycle of the signal output by the information writer 32 is changed on the basis of the current value supplied to the memory unit 31, and before the dielectric breakdown of the MOS structure of the anti-fuse element 311, the information writer 32 outputs a signal having a relatively high frequency. Then, the information writer 32 outputs a signal having a relatively low frequency after being brought into the soft breakdown state of the MOS structure, and suppresses the output of the signal after being brought into the hard breakdown state. Due to this, electric energy required to change from a state before dielectric breakdown to a state after dielectric breakdown is supplied to the MOS structure without excess or deficiency. Although a difference in electrical characteristics due to, for example, manufacturing variation can occur among the plurality of anti-fuse elements 311, according to the present embodiment, writing of information to the individual anti-fuse elements 311 can be appropriately realized regardless of the difference in electrical characteristics.

Incidentally, as a step between S4110 and S4200, a signal having a frequency f3 (<f2) may be supplied to the memory unit 31 by the information writer 32. At this time, a predetermined number of signal pulses are to be supplied to the memory unit 31 as the signal having the frequency f3. This can ensure a hard breakdown state of the MOS structure of the anti-fuse element 311.

Figure 5B:
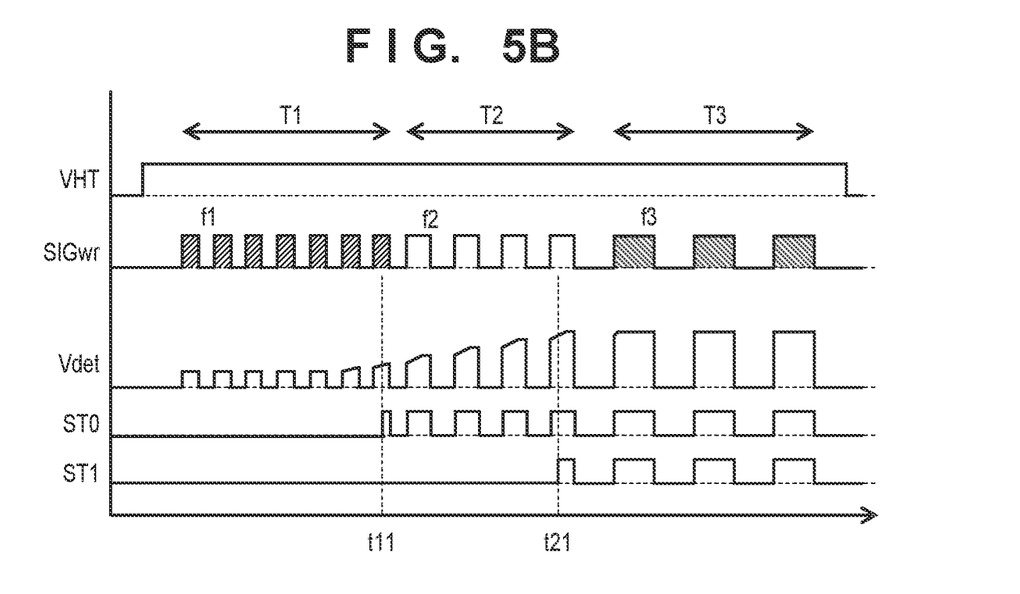
FIG. 5B is a timing chart when information is written into the memory unit.

FIG. 5B presents a timing chart in a case where a signal having the frequency f3 is incidentally supplied to the memory unit 31, similarly to FIG. 5A. In the figure, the horizontal axis represents the time axis, and the vertical axis represents the voltage VHT, a signal SIGwr output by the information writer 32, the voltage Vdet corresponding to the current value supplied to the memory unit 31, and the signals ST0 and ST1.

With the signals ST0 and ST1 becoming at the H level at time t21, in a period T3, a signal pulse having the frequency f3 is supplied to the memory unit 31 over a predetermined period as the signal SIGwr. Here, three signal pulses having the frequency f3 are supplied, but the number of supplied signal pulses is not limited to this example.

As described above, according to the present embodiment, electric energy can be efficiently supplied to the MOS structure without excess or deficiency when information is written to the anti-fuse element 311, and the MOS structure can be changed from a state before dielectric breakdown to a state after dielectric breakdown relatively quickly. Therefore, according to the present embodiment, it is possible to relatively easily realize more appropriate writing of information into the storage apparatus 3.

Figure 6A:
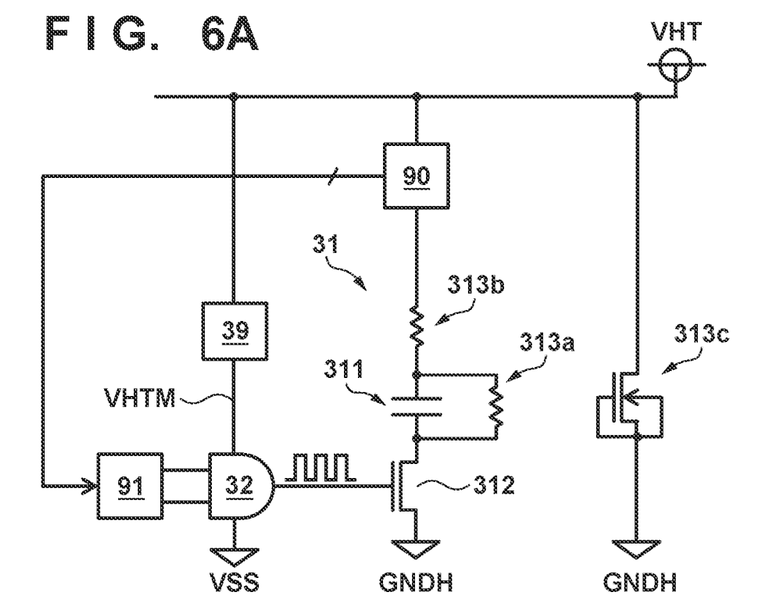
FIG. 6A illustrates another configuration example of the memory unit.
Figure 6B:
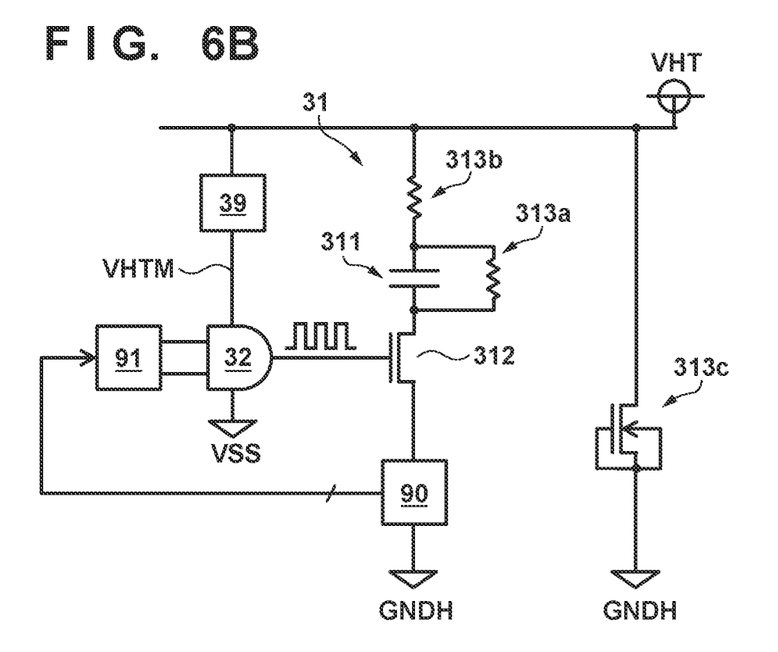
FIG. 6B illustrates another configuration example of the memory unit.

FIGS. 6A and 6B illustrate another configuration example of the memory unit 31.

FIG. 6A illustrates an example of a case where a clamping transistor is used as the protection element 313c. This transistor is typically used to satisfy evaluation test criteria based on a predetermined ESD standard, and examples of the standard include the human body model (HBM) and the machine model (MM).

FIG. 6B illustrates an example in a case where the positional relation between the memory unit 31 and the current detection unit 90 is changed. That is, since the current value supplied to the memory unit 31 and the current value output from the memory unit 31 are substantially the same, the current detection unit 90 may be arranged to detect the current output from the memory unit 31.

In any case of FIGS. 6A and 6B, a rectification element may be used as the protection element 313c, and in this case, the anode can be grounded and the cathode can be connected to the power source line of the voltage VHT.

Figure 7:
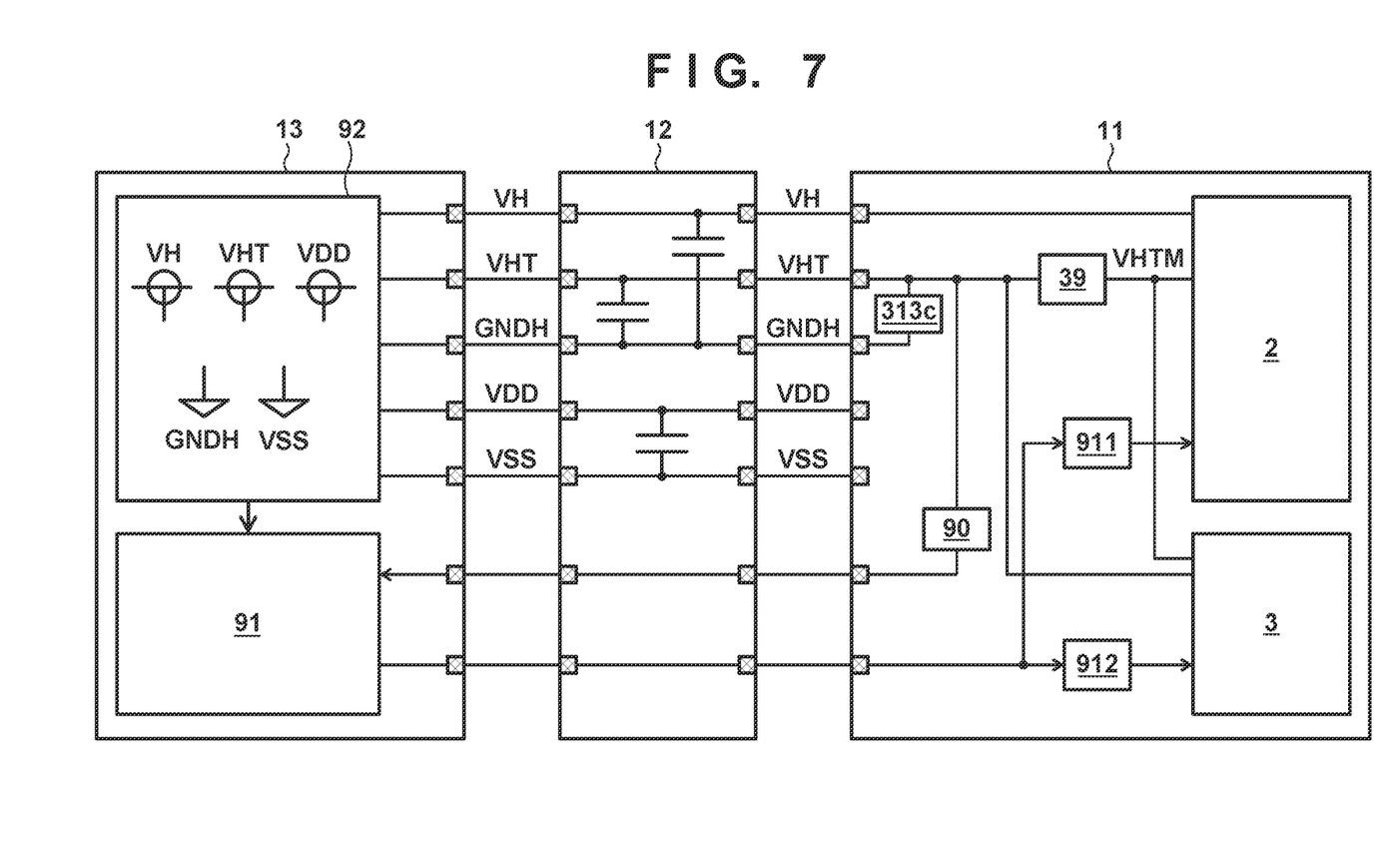
FIG. 7 is a view illustrating an example of a connection relation among elements in the liquid discharge apparatus.

FIG. 7 is a view illustrating a connection relation among the liquid discharge head 11, the carriage 12, and the head controller 13 in the liquid discharge apparatus 1.

The main function (here, arithmetic processing) of the control unit 91 can be provided in the head controller 13, and some functions can be provided in the liquid discharge head 11 as a function control unit 911 and a storage control unit 912. With such a configuration, arithmetic processing for the entire system of the liquid discharge head 11 is mainly executed by the head controller 13. The drive control of the functional unit 2 and the storage apparatus 3 is performed by the function control unit 911 and the storage control unit 912, respectively, in the liquid discharge head 11 on the basis of a signal of the control unit 91.

The head controller 13 further includes a voltage generation unit 92. The voltage generation unit 92 generates a plurality of voltage VH and the like on the basis of an external voltage. The voltage VH (for example, 24 V (volt)) can be mainly used for drive control of the functional unit 2. The voltage VHT (for example, 24 V) can be mainly used for drive control of the storage apparatus 3. A voltage VDD (for example, 3.3 V) can be used for arithmetic processing by a logic circuit unit that performs drive control of the functional unit 2 and the storage apparatus 3. A voltage VSS (for example, 0 V) is generated as the ground voltage corresponding to the voltage VDD, and a voltage GNDH (for example, 0 V) is generated as the ground voltage corresponding to the voltages VH and VHT.

Among the above-described voltage VH and the like, by individually providing those having the same potential, it is possible to prevent electrical mutual interference among the power source systems due to potential fluctuation, but these may be commonly provided.

The carriage 12 includes a plurality of power lines for transmitting, to the liquid discharge head 11, the above-described voltage VH and the like generated by the voltage generation unit 92. A capacitor can be provided between the power lines in order to prevent potential fluctuations of them.

The liquid discharge head 11 receives the voltage VH and the like from the voltage generation unit 92 of the head controller 13 via the carriage 12. On the basis of an instruction from an external apparatus, the control unit 91 performs drive control of each of the functional unit 2 and the storage apparatus 3 of the liquid discharge head 11 using the voltage VH or the like. For example, the functional unit 2 can realize a recording function on the basis of the voltage VH, and the storage apparatus 3 can realize writing of information on the basis of the voltage VHT. The control unit 91 may be expressed as a calculation unit or the like.

Figure 8:
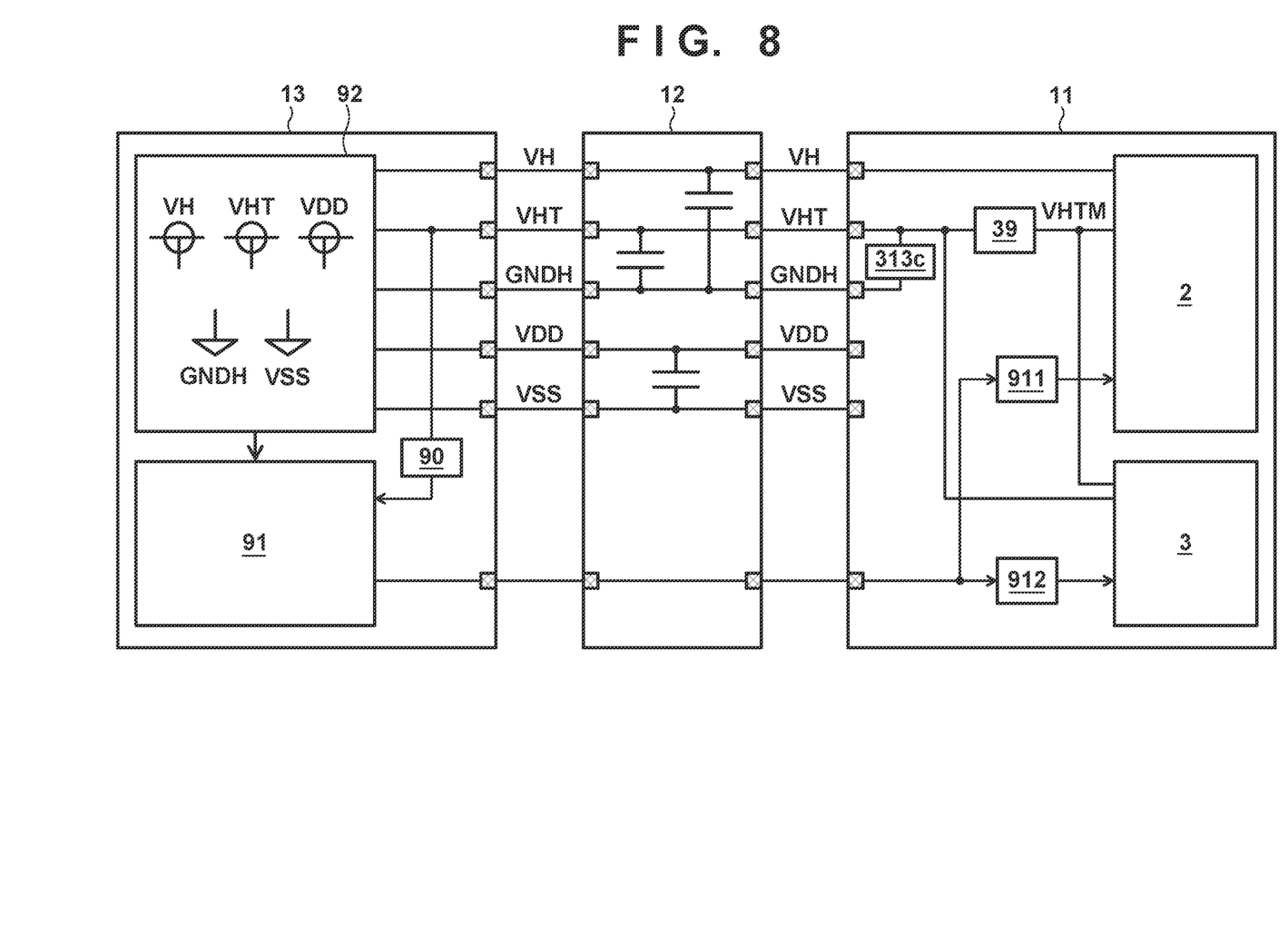
FIG. 8 is a view illustrating another example of a connection relation among elements in the liquid discharge apparatus.

The current detection unit 90 is to be connected to the power line of the voltage VHT used for drive control of the storage apparatus 3, and is installed in the liquid discharge head 11 in the example of FIG. 7, that is, connected to the power line of the voltage VHT in the liquid discharge head 11. As another example, the current detection unit 90 may be installed in the head controller 13 as illustrated in FIG. 8, and in this case, the current detection unit may be connected to the power line of the voltage VHT in the head controller 13. As still another example, the current detection unit 90 may be installed in the carriage 12 as illustrated in FIG. 9, and in this case, the current detection unit is to be connected to the power line of the voltage VHT in the carriage 12.

Figure 9:
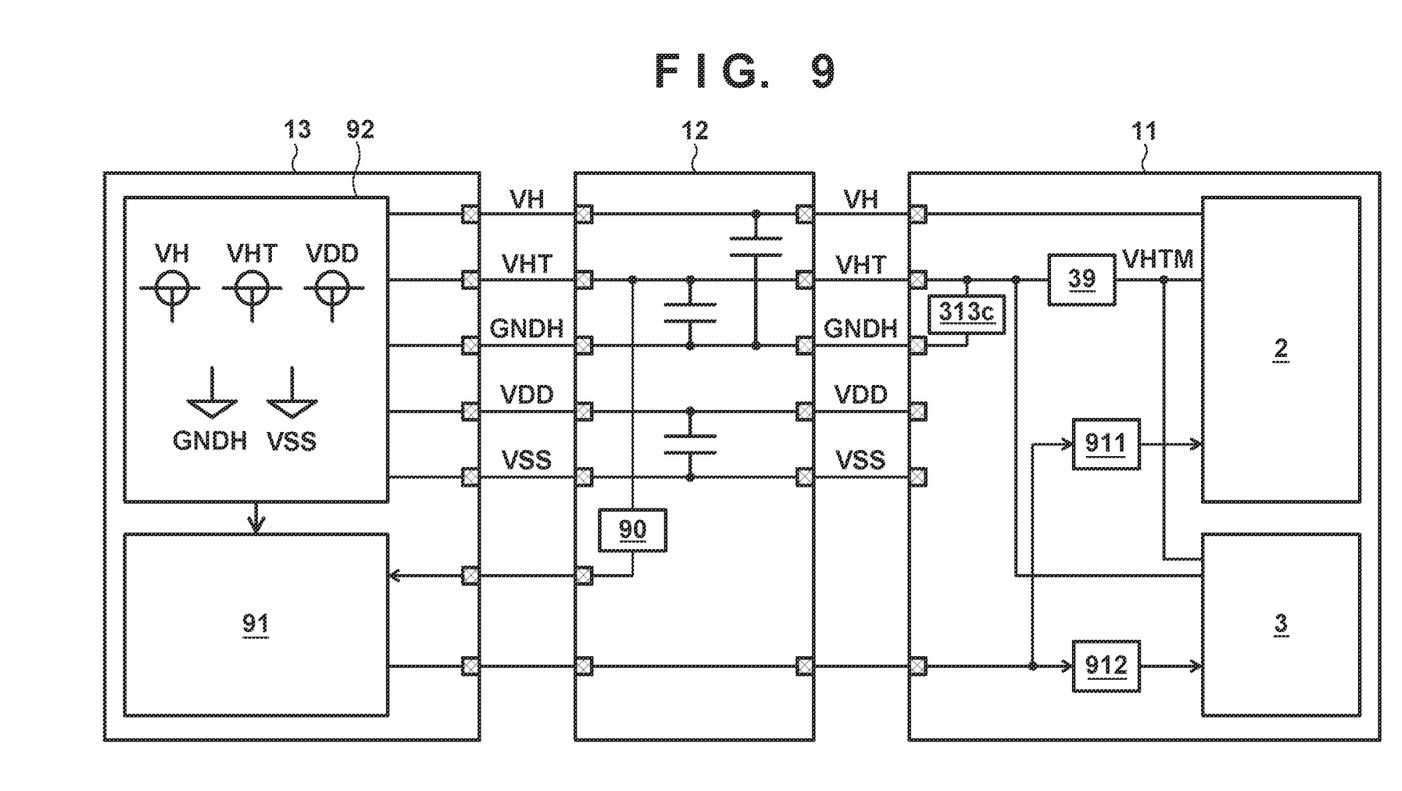
FIG. 9 is a view illustrating another example of a connection relation among elements in the liquid discharge apparatus.

In any of the examples of FIGS. 7 to 9, appropriate writing of information into the storage apparatus 3 can be realized relatively easily. In these examples, the signals ST0 and ST1 as the detection result of the current detection unit 90 are output to the control unit 91, and the setting and change of the frequency fm of the signal to be output by the information writer 32 are performed by the control unit 91. However, various modifications may be made to this configuration without departing from the spirit of the embodiment. For example, the signals ST0 and ST1 may be output to the storage control unit 912, and the setting and change of the frequency fm may be performed by the storage control unit 912.

In the above description, for ease of understanding, each element is indicated by a name related to its functional aspect, but each element is not limited to one having the content described in the embodiment as a main function, and may be one having the content supplementarily. Therefore, each element is not strictly limited to the expression, and the expression can be replaced with a similar expression. For the same purpose, the expression "apparatus" may be replaced with "unit", "component or piece", "member", "structure", "assembly", or the like, or may be omitted.

Here, for ease of understanding, a plurality of elements respectively corresponding to the plurality of above-described functions are individually exemplified, but they may be configured at least partially integrally, or some of them may be configured separately.

(Program)

The present invention may be realized by processing of supplying a program for realizing one or more functions of the above embodiment to a system or an apparatus via a network or a storage medium, and one or more processors in a computer of the system or the apparatus reading and executing the program. For example, the present invention may be realized by a circuit (for example, ASIC) that realizes one or more functions.

(Others)

In the above description, an inkjet type recording apparatus has been exemplified as the liquid discharge apparatus 1, but the apparatus 1 is not limited to this. That is, the apparatus 1 may be a single function printer having only a recording function, or may be a multi-function printer having a plurality of functions such as a recording function, a FAX function, and a scanner function. For example, the apparatus 1 may be a manufacturing apparatus for manufacturing a color filter, an electronic device, an optical device, a small structure, or the like by a predetermined recording method.

The term "record" used in the present description should be interpreted broadly. Therefore, in the mode of "record", it does not matter whether or not an object formed on a recording medium is significant information such as a character or a figure, and it does not matter whether or not the object is actualized so that a human can visually perceive the object.

The "recording medium" should be interpreted broadly similarly to the "recording". Therefore, the concept of the "recording medium" can include any member that can receive ink, such as cloth, plastic film, metal plate, glass, ceramics, resin, wood, and leather, in addition to paper that is generally used.

Furthermore, "ink" should be interpreted broadly similarly to the "record". Therefore, the concept of "ink" can include not only a liquid that is applied onto a recording medium to form an image, a figure, a pattern, or the like, but also an accompanying liquid that can be used for processing of the recording medium, processing of the ink (for example, coagulation or insolubilization of a coloring agent in the ink applied to the recording medium), or the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-057093, filed on Mar. 30, 2022, which is hereby incorporated by reference herein in its entirety.

What is claimed is:

1. A storage apparatus comprising:
    a memory unit including an anti-fuse element, a resistance element connected in parallel to the anti-fuse element, and a switch element connected in series with the anti-fuse element, wherein if the switch element is in a conductive state a current is supplied to the anti-fuse element and if the switch element is in a non-conductive state the current is not supplied to the anti-fuse element;
    a current detection unit for detecting a current value supplied to the memory unit; and
    an information writer that writes information into the anti-fuse element by applying a cyclical signal to the switch element to change the state of the switch element between the conductive state and the non-conductive state,
    wherein the anti-fuse element comprises a metal oxide semiconductor (MOS) structure,
    wherein the current value detected by the current detection unit indicates a dielectric breakdown state of the MOS structure of the anti-fuse element,
    wherein the information writer applies a first signal of having a first cycle to the switch element before a current value supplied to the memory unit reaches a first reference value, and applies a second signal having a second cycle larger than the first cycle to the switch element after the current value supplied to the memory unit reaches the first reference value, and
    wherein the first reference value corresponds to a change in the MOS structure from a state before dielectric breakdown to a soft dielectric breakdown state.

2. The storage apparatus according to claim 1 further comprising a protection element connected in parallel to the memory unit.

3. The storage apparatus according to claim 2, wherein with the resistance element as a first resistance element, the storage apparatus further includes a second resistance element disposed between a power source line for supplying a power source voltage to the memory unit and the memory unit.

4. The storage apparatus according to claim 3, wherein the information writer changes a cycle of a signal to be applied to the anti-fuse element on a basis of a current value supplied to the anti-fuse element specified by comparison between a voltage generated in the second resistance element and a reference voltage.

5. A liquid discharge head comprising:
    the storage apparatus according to claim 1; and
    a liquid discharge element for discharging liquid.

6. A liquid discharge apparatus comprising:
    the liquid discharge head according to claim 5; and
    a head controller for performing drive control of the liquid discharge head.

7. The liquid discharge apparatus according to claim 6, wherein the current detection unit is installed in the liquid discharge head.

8. The liquid discharge apparatus according to claim 6, wherein the current detection unit is installed in the head controller.

9. The liquid discharge apparatus according to claim 6 further comprising:
    a carriage configured to move the liquid discharge head on a basis of a control signal from the head controller,
    wherein the current detection unit is installed in the carriage.

* * * * *